United States Patent

[11] 3,542,333

[72] Inventor Harald Stampfli
 Petit-Saconnex, Switzerland
[21] Appl. No. 788,142
[22] Filed Dec. 31, 1968
[45] Patented Nov. 24, 1970
[73] Assignee Lucifer S.A.
 Carouge-Geneva, Switzerland
 a company of Switzerland
[32] Priority Jan. 19, 1968
[33] Switzerland
[31] No. 890/68

[54] VALVE INCLUDING AT LEAST ONE FLOATING FLAP
 8 Claims, 2 Drawing Figs.
[52] U.S. Cl. ................................................... 251/85,
 251/129, 251/139
[51] Int. Cl. ..........................................F16k 25/00,
 F16k 31/06
[50] Field of Search............................................ 251/86,
 129, 139, 85

[56] References Cited
UNITED STATES PATENTS

| | | | |
|---|---|---|---|
| 794,034 | 7/1905 | Millett et al. .................. | 251/86X |
| 2,311,110 | 2/1943 | Johnson ........................ | 251/85X |
| 3,464,668 | 9/1969 | Jacob ............................ | 251/139X |

FOREIGN PATENTS

| | | | |
|---|---|---|---|
| 984,260 | 2/1965 | Great Britain................ | 251/85 |

Primary Examiner—Arnold Rosenthal
Attorney—Waters, Roditi, Schwartz & Nissen

ABSTRACT: A valve of the type including at least one flap valve floatingly carried inside a movable member and urged by a spring against its seat wherein the thrust of the spring is caused to be aligned with the seat axis as obtained by inserting between the spring and the flap an intermediate member such as a ball or a sliding piston, provided with a convex surface engaging the flap at a point aligned with the axis of said seat.

Patented Nov. 24, 1970

3,542,333

VALVE INCLUDING AT LEAST ONE FLOATING FLAP

Valves are known already which include at least one flap floatingly carried in a housing formed in a movable member and subjected to the action of a spring also carried in said housing. In such valves and chiefly when the flap is to engage a seat the diameter of which is equal to or smaller than that of the spring, it is necessary for the direction of the force exerted by the spring to register as accurately as possible with the geometrical axis of the seat. As matter of fact a shifting of said force with reference to the seat axis leads to modifications in the pressure exerted by the flap engaging the seat along its line of contact therewith, which may detrimentally affect the fluid-tightness obtained. This is particularly important in the case where the flap is provided with a closing disc made of hard material.

It is a very difficult matter to produce coil springs wherein the axis of the force developed wherein registers with the geometrical axis of the spring and consequently the above difficulties.

The present invention has for its object to remove said difficulties. It relates to a valve including at least one flap frictionally fitted in a recess of the movable member and subjected to the action of a spring also housed in said recess and urging said flap towards a nozzle to be closed. According to the invention the valve includes an intermediate member transmitting the force exerted by the spring to the flap, said intermediate member being guided in the movable member and engaging the flap along a substantially punctual contacting area, which area is located on the nozzle axis.

The accompanying drawings illustrate diagrammatically and by way of example an embodiment of the invention and a modification thereof.

Figure 1:
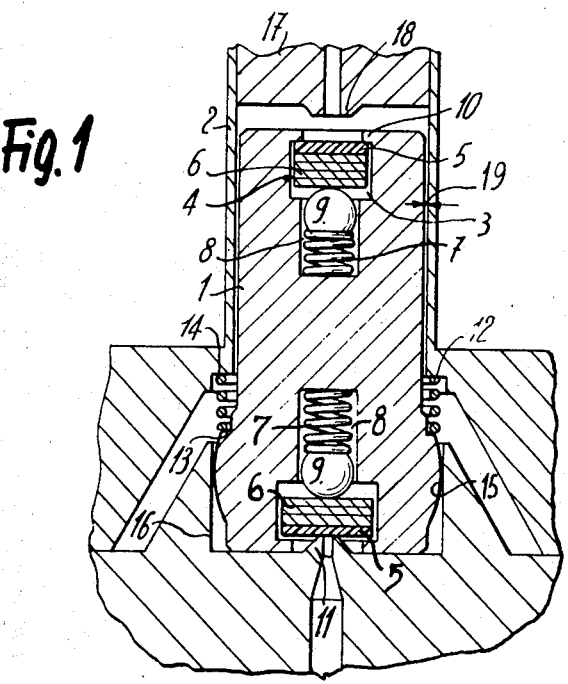
FIG. 1 is a sectional view of a fraction of an electromagnetically controlled valve incorporating a movable core.

As shown in FIG. 1, the electromagnetically controlled valve includes a core 1 sliding in a tubular member 2 under the action of an electromagnetic field generated by a winding, not illustrated, which is positioned round the tubular member 2. The core 1 made of ferromagnetic material is provided at each end with a housing 3 in which a flap 4 is floatingly fitted. Said flap is constituted by a closing disc 5 of a very hard material for instance a synthetic stone, said disc 5 being adjacent to a disc 6 of soft and elastic material. A coil spring 7 is inserted in a cylindrical chamber 8 opening coaxially into the housing 3 and urges the flap 4 through the agency of a ball 9 against its seat. Said ball 9 is carried and guided inside the cylindrical chamber 8. The flap 4 is held in its recess 3 by an inner shoulder 10 formed on the movable core.

The core is urged downwardly towards a nozzle 11 by a spring 12 bearing on the one hand at its lower end against a shoulder 13 of the core and on the other hand at its upper end against an inner shoulder 14 of the tubular member 2. At its lower end, the outer surface of the core 1 is provided with an annular part spherical area of which the spherical center registers with that of the wall 9 carried in the lower chamber 9 of the core. The guiding area 15 is fitted inside a cylindrical bore 16 formed coaxially with the nozzle 11 in the tubular member 2.

Under the action of the electromagnetic energizing field, the core 1 is drawn upwardly towards a stationary core 17 made of ferromagnetic material, which stationary core is also provided with a nozzle 18.

The guiding members 15 and 16 provided at the lower end of the core 1 are highly satisfactory by reason of the registering of the center of the ball 9 with that of the guiding area 15. Thus, the center of the ball 9 remains aligned with the axis of the nozzle 11, even if the core enters a slightly oblique position as a consequence of the annular clearance 19 provided between the core 1 and the cooperating bore in the tubular member 2 as required, so as to allow an easy sliding of said core.

Figure 2:
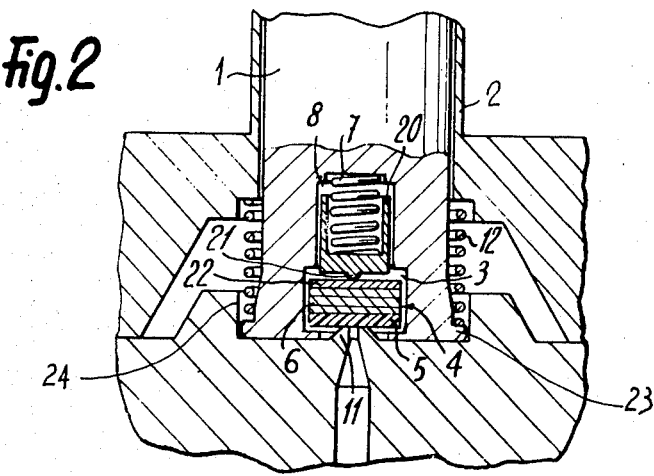
FIG. 2 shows a modification of the lower section of the core illustrated in FIG. 1.

FIG. 2 relates to a modification wherein the intermediate member is constituted by a piston 20 carrying a hemispherical projection 21 adapted to cooperate with the flap 4 in order to transmit to the latter the thrust exerted by the spring 17. In this modification, the radius of said projection 21 is much smaller than that of the ball 9 in the case illustrated in FIG. 1, so that it is of advantage for the flap to engage said projection 21 through a comparatively hard surface. For this reason, a disc 22 of hard material covers the disc 6 of soft material.

The core 1 is guided in the case illustrated in FIG. 2 by a shoulder 23 forming a bearing for the spring 12 inside a cylindrical recess 24 formed coaxially with the nozzle 11 in the tubular member 2. Any shifting between the center of the guiding member and the hemispherical bearing surface is small enough for it to have no practical effect on the alignment of the flap 4 with reference to the axis of the nozzle 11.

In both cases illustrated, the contact between the intermediate member, whether the ball 9 or the piston 20, and the flap 4 is practically punctual and remains substantially on the axis of the nozzle 11 or 18, as the case may be. The result is that the force urging the flap against the nozzle registers in practice with the axis of the nozzle, even in the case where the force exerted by the spring 7 operates along a line slightly inclined with reference to the nozzle axis.

In both embodiments described, the disc 6 of soft material has for its object to damp the shocks produced by the closing of the nozzle 11 by the disc 5 of hard material and to prevent any rebounds of the latter. Said disc 5 may for instance be made of a synthetic ruby or sapphire. Obviously, according to the size of the flap and to the energy and speed of the closing thrust, different damping characteristics may be provided e.g. by modifying the thickness of the disc 6 and the material forming the latter. It is also possible to stack several discs showing different damping characteristics.

I claim:

1. A valve comprising a carrier member provided with a cylinder chamber and at least one nozzle opening axially therein, a movable member slidingly carried inside said carrier member between two extreme positions and provided with a housing opening towards the corresponding nozzle and coaxial with the latter, means urging the movable member towards one extreme position, a flap floatingly carried in said housing and adapted to close the nozzle opening when operative, a spring located inside the housing to the rear of the flap with reference to the nozzle and an intermediate member slidingly carried inside the housing between the spring and the flap and through which the spring urges the flap into its operative position engaging the opening of the nozzle, said intermediate member engaging the flap along a substantially punctual area aligned with the nozzle axis.

2. A valve as claimed in claim 1, wherein the intermediate member is provided with a convex surface facing the flap and adapted to tangentially engage the latter on said punctual area.

3. A valve as claimed in claim 1, wherein the intermediate member is a ball tangentially engaging the flap on said punctual area.

4. A valve as claimed in claim 1, wherein the spring is a coil spring and the housing includes at the rear a coaxial cylindrical extension enclosing the spring and at least a part of the intermediate member being guided therein.

5. A valve as claimed in claim 1, wherein the flap includes on the side facing the nozzle a hard disc and to the rear of the latter and in juxtaposed relationship thereto a coaxial disc of soft elastic material engaged by the intermediate member.

6. A valve as claimed in claim 1, the movable member of which forms the core of an electromagnet.

7. A valve as claimed in claim 1, wherein the intermediate member is provided with a part spherical convex surface facing the flap and adapted to tangentially engage the latter at a point registering with the nozzle axis and the movable member is provided with an annular part spherical surface concentric with said convex surface and engaging the inner wall of the housing.

8. A valve as claimed in claim 1, wherein the intermediate member is constituted by a piston terminating with a part spherical projection facing the flap and engaging the latter on said punctual area and the housing includes at the rear a coaxial cylindrical extension enclosing the spring and the rear part of the piston.